United States Patent [19]

Martin

[11] 3,917,759
[45] Nov. 4, 1975

[54] DOMESTIC HUMIDIFIER
[76] Inventor: Andre Martin, 38 Stewart St., Kapuskasing, Ontario, Canada
[22] Filed: Jan. 30, 1974
[21] Appl. No.: 437,770

[30] Foreign Application Priority Data
Oct. 9, 1973 Canada .............................. 182926

[52] U.S. Cl. ............................ 261/36 R; 261/112
[51] Int. Cl.² .......................................... B01F 3/04
[58] Field of Search ...... 261/36 R, 112, 119 R, 130, 261/DIG. 14, DIG. 44, DIG. 15; 55/240, 241; 239/17, 21, 23; D23/3, 13, 33, 144–147

[56] References Cited
UNITED STATES PATENTS

| | | | |
|---|---|---|---|
| 1,654,826 | 1/1928 | Moore ................................ | 261/112 |
| 1,876,142 | 9/1932 | Jones ............................. | 261/112 X |
| 1,886,192 | 11/1932 | Jones ............................. | 261/112 X |
| 1,905,422 | 4/1933 | Rasmussen ....................... | 261/112 |
| 3,298,609 | 1/1967 | Tiwari ................................. | 239/17 |
| 3,493,216 | 2/1970 | Johnson ......................... | 261/112 X |
| 3,555,786 | 1/1971 | Cochran ......................... | 261/112 X |
| 3,782,629 | 1/1974 | Hruby, Jr. .............................. | 239/17 |
| 3,785,626 | 1/1974 | Bradley, Jr. et al. ............... | 261/36 R |
| 3,811,252 | 5/1974 | Evans et al. ........................ | 55/240 X |

FOREIGN PATENTS OR APPLICATIONS
497,905   12/1925   Germany ............................ 261/112

Primary Examiner—Tim R. Miles
Assistant Examiner—Richard L. Chiesa

[57] ABSTRACT

A domestic humidifier for humidifying one or several rooms in a house and which is also ornamental. The humidifier consists of a series of small streams and interconnecting falls. It comprises a hollow body having a front generally rectangular wall, which is inclined and which defines a series of superposed longitudinally extending small stream forming troughs arranged in step-like manner, each trough slightly vertically inclined in an opposite direction with respect to two adjacent troughs. The front wall has steep fall forming portions joining the downstream end of one trough with the upstream end of a subjacent trough. A water reservoir and a pump are located within the hollow body. The pump has an outlet pipe discharging into the upstream end of the highest trough. The lowest trough has a drain hole connected to a drain pipe returning the water to the reservoir. Each trough is, moreover, provided with an auxiliary fall forming groove connecting an intermediate portion of the trough and discharging a portion of the water flowing through the same directly into a subjacent trough. A control valve serves to regulate the flow of water through the system. The water flowing through the troughs and on the steep fall forming portions has a great surface area in contact with air and circulates at a relatively high speed, resulting in good evaporation of water within the room.

10 Claims, 8 Drawing Figures

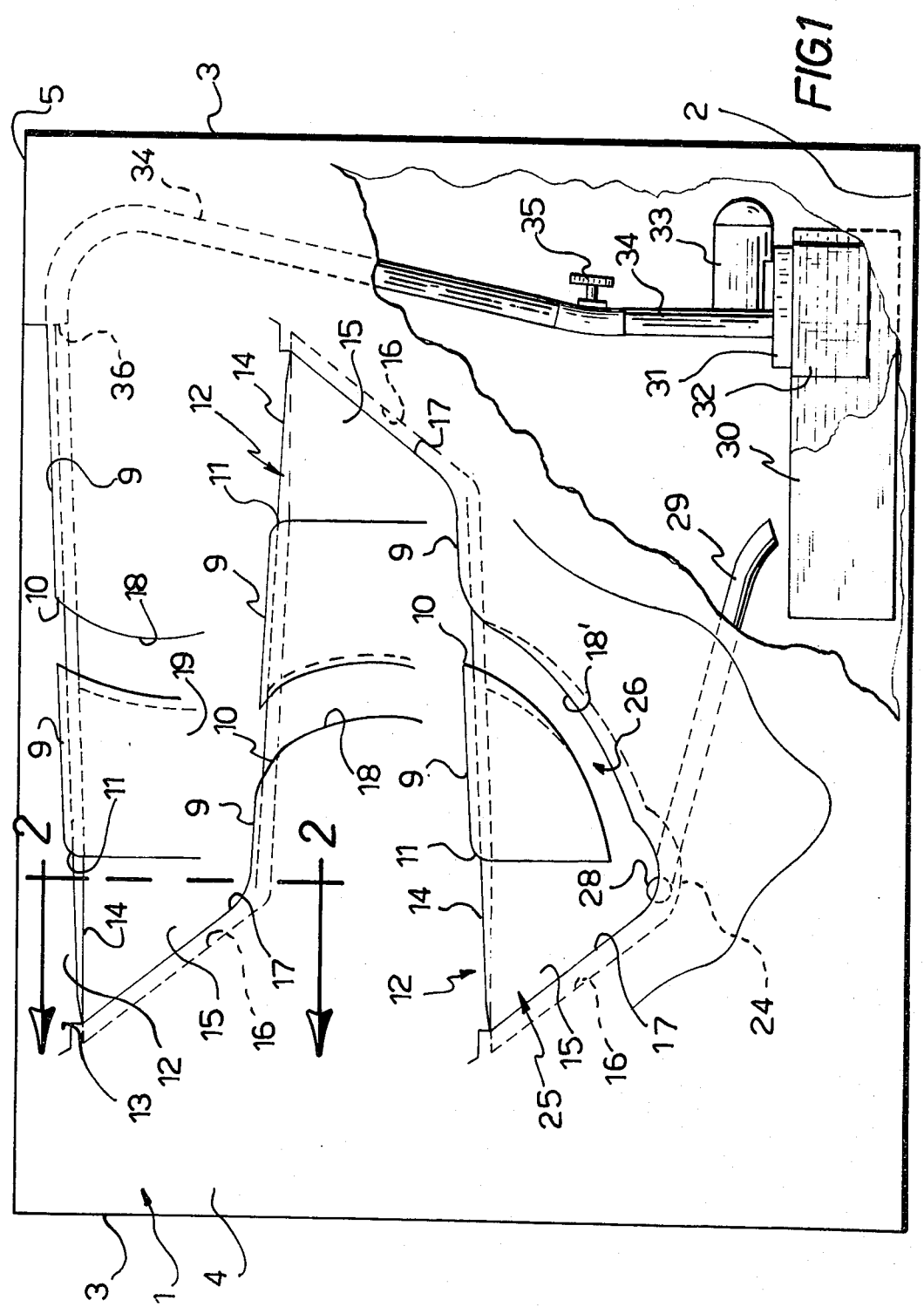

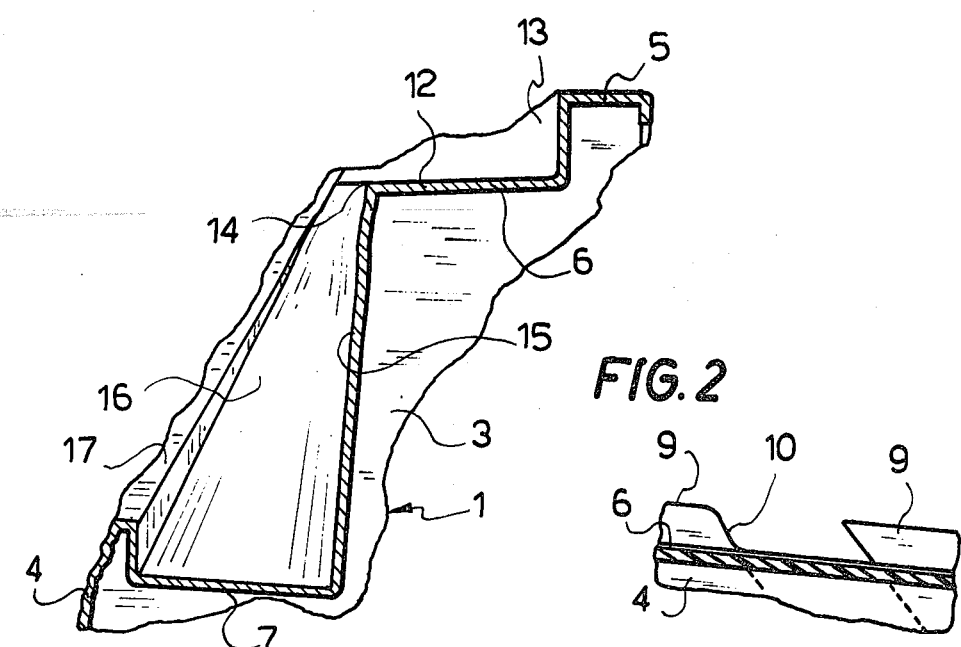

DOMESTIC HUMIDIFIER

The present invention relates to a domestic humidifier serving to humidify air in a room and which also forms a decorative and ornamental object.

Known domestic humidifiers generally comprise a large diameter wheel providing a water absorbing cylindrical surface which is partially immersed in a water bath and which turns at low speed; an air fan circulates water in contact with the humidified surface of the wheel; the system is mounted within a housing provided with apertures for the free circulation of the humidified air. These apparatuses are relatively noisy, due to the fan and motors for the fan and the wheel, and are not decorative due to the rectangular or square shape of the housing. In all of these devices, the main object is to increase as much as possible the air humidifying efficiency.

The general object of the present invention is to provide a humidifier which obviates the above-mentioned disadvantages.

In accordance with the invention, the humidifier comprises a hollow body having a vertically inclined front wall which is shaped to constitute a series of superposed troughs slightly inclined in opposite directions and intercommunicating by means of steep inclines for forming falls. A water reservoir and a water circulating pump are located within the hollow body to circulate the water between the upstream end of the highest trough and the downstream end of the lowest trough. The water circulates in the various superposed troughs and along the steep inclines to thus form a series of small streams alternating with a series of falls.

The circulating pump can be covered with sound insulating material, whereby the only noise produced is the agreeable sound produced by the circulating water. Moreover, the apparatus is highly decorative and circulating water is attractive to see, being an imitation of mountain streams. The evaporating efficiency is relatively high due to the fact that the water circulates at relatively high speed with respect to the air and forms a shallow water layer disposed over a great surface.

Another object of the invention is to provide a humidifier of the character described, in which the bottom of the trough and of the steep fall-forming inclines are provided with ribs serving to agitate the water in a manner similar to a river rapid, still increasing the humidifying efficiency.

Another object of the invention is to provide a system of troughs of the character described, arranged in such a manner that the water will not overflow from its intended circuit.

Another object of the invention is to provide a humidifier of the character described, in which the water flow is relatively important with respect to the dimensions of the device in order to still increase the humidifying capacity.

The foregoing and other objects of the present invention will become more apparent during the following disclosure and by referring to the drawings, in which:

FIG. 1 is an elevation of the front face of the humidifying apparatus of the invention;

FIG. 2, shown on the third sheet of drawings, is a partial section taken along line 2—2 of FIG. 1;

FIG. 3 is a schematic top plan view showing the trough and fall system;

FIG. 4 is a cross-section, on a reduced scale, taken along line 4—4 of FIG. 3; and FIGS. 5, 6, 7, and 8 are partial sections taken along lines 5—5, 6—6, 7—7, and 8—8, respectively, of FIG. 3.

In the drawings, like reference characters indicate like elements throughout.

Referring to FIGS. 1 and 4, the apparatus comprises a hollow body 1, of generally rectangular shape when seen from the front, and including a base 2 adapted to rest on a floor; straight and flat sides 3 and a front wall 4 which is upwardly and rearwardly inclined with respect to body 1. Body 1 further includes a top 5, which is relatively narrow. The back of the body is open to gain access to the various elements within the same. As an example, body 1 can have a height of between 3 and 5 feet and a length of between 3 and 5 feet, namely the distance between sides 3.

In accordance with the invention, front wall 4 is grooved or shaped to form a series of superposed troughs arranged in a step-like manner and communicating with one another by means of steel fall-forming inclines. As shown in FIGS. 1 and 4, there are provided an uppermost trough 6, an intermediate trough 7 and a lowermost trough 8. Obviously, there can be more than three troughs. Each trough 6, 7, and 8 is longitudinally arranged with respect to body 1 and is slightly inclined with respect to the vertical. Each trough is inclined in an opposite direction with respect to two adjacent troughs. Thus, referring to FIG. 1, uppermost trough 6 is inclined towards to the left; trough 7 towards the right; and trough 8 towards the left.

Moreover, each trough is slightly inclined transversely of its longitudinal extent in at least a portion of its length. The uppermost trough 6 is first transversely horizontal, then slightly downwardly inclined towards the front of the hollow body in its downstream portion, as shown in FIGS. 2 and 5, whereas troughs 7 and 8 are transversely downwardly inclined toward the back of the hollow body, as shown in FIGS. 2 and 4. Each trough is provided with an external guard wall 9 over a portion of its length. However, this guard wall is interrupted intermediate its ends to form a recess 10 for the passage of the water and terminates at 11 short of the downstream end of the trough. The downstream portion of each trough is tapered to form a triangular portion when seen in plan view, as shown in FIGS. 3 at 12, this tapered portion being defined by an inclined portion 13 of the front wall 4 in order to conduct all of the water within the trough towards the ridge 14 of a steep incline 15 forming the bottom of a water fall. This steep incline 15 is disposed longitudinally of the hollow body 1 and has its downstream, or lower edge, joined with another inclined portion 16 of much smaller steepness than part 15 and which is disposed longitudinally of the body 1.

Incline 16 is provided with a guard wall 17 along its outer edge, as shown in FIG. 2, and is of generally triangular form, when seen in top plan view, as shown in FIG. 3. Guard wall 17 is extended by the guard wall 9 of the subjacent trough. Each recess 10 enables a part of the water in the trough to directly discharge into an auxiliary fall formed by a steep groove, shown at 18, and made in the front wall 4 of the hollow body 1 and which enables a portion of the water to directly fall into an intermediary portion of the subjacent trough. When seen in plan view, grooves 18 are downwardly inclined longitudinally of the hollow body in such a way as to dispect to the longitudinal axes of said troughs in a direction towards the upstream end of the associated subjacent trough in order that the water flowing in said auxiliary falls is counter current to the water flowing within said subjacent trough.

4. A humidifier as claimed in claim 2, wherein the front wall forms bosses transversely aligned with said recesses to deviate water flowing within the troughs towards said recesses and to said auxiliary falls.

5. A humidifier as claimed in claim 2, wherein at least a portion of the bottom of said troughs is provided with ribs for agitating water flowing within said troughs.

6. A humidifier as claimed in claim 2 wherein said steep inclines are provided with ribs to increase water agitation along the steep inclines.

7. A humidifier as claimed in claim 1, wherein said drain cavity has a rounded shape and a discharge opening on one side of said cavity, said cavity is located immediately underneath the downstream portion of the lowermost trough and higher than the bottom of the cavity in communication with one steep incline cascading from the lowermost trough and arranged for flowing water along said last-named steep incline tangentially to the rounded cavity to create a whirlpool in the latter before being discharged through said discharge opening.

8. A humidifier as claimed in claim 7, further including a ball in said cavity adapted to be rotated by said whirlpool.

9. A domestic humidifier as claimed in claim 1, wherein said front wall forms a front face and a rear face, said troughs, transversely steep strip portions, and said steep inclines are formed on the front face, said hollow body defines a rearwardly opening chamber against said rear face, and said power-actuated means is mounted in said chamber in concealment behind said front wall.

10. A domestic humidifier as claimed in claim 9, further including valve means to manually control the water flow in said troughs and on said inclines, and said power-actuated means including a water reservoir and a submersible pump operatively immersed in the water reservoir.

* * * * *

United States Patent [19]

Swatman

[11] 3,917,760
[45] Nov. 4, 1975

[54] CARBURETTERS FITTED TO INTERNAL COMBUSTION ENGINES

[75] Inventor: Peter Phillimore Swatman, Solihull, England

[73] Assignee: British Leyland (Austin-Morris) Limited, Birmingham, England

[22] Filed: Jan. 25, 1974

[21] Appl. No.: 436,650

[52] U.S. Cl. ...... 261/39 B; 123/187.5 R; 261/39 E; 261/44 R; 261/DIG. 8
[51] Int. Cl.² .......................................... F02M 1/12
[58] Field of Search. 261/44 R, 39 D, 39 B, DIG. 1, 261/DIG. 8, 39 E, 50 A; 123/180 A, 187.5 R

[56] References Cited
UNITED STATES PATENTS

| | | |
|---|---|---|
| 3,285,585 | 11/1966 | Mennesson .................. 261/50 A X |
| 3,460,814 | 8/1969 | O'Neill ............................ 261/44 R |
| 3,576,315 | 4/1971 | Sutton ........................ 123/180 R X |
| 3,677,241 | 7/1972 | Gele et al. .................... 261/50 A X |
| 3,746,321 | 7/1973 | DePontac ........................ 261/50 A |
| 3,835,831 | 9/1974 | Ross ........................... 123/180 R X |

FOREIGN PATENTS OR APPLICATIONS
335,680   2/1936   Italy ............................. 123/180 R Primary Examiner—Tim R. Miles
Assistant Examiner—William Cuchlinski, Jr.
Attorney, Agent, or Firm—Brisebois & Kruger

[57] ABSTRACT

A constant depression or velocity carburetter incorporates an enriching device which acts to increase fuel enrichment with decreasing engine temperature. The carburetter can also include a manifold depression sensor which additionally acts to increase fuel enrichment with decreasing manifold depression.

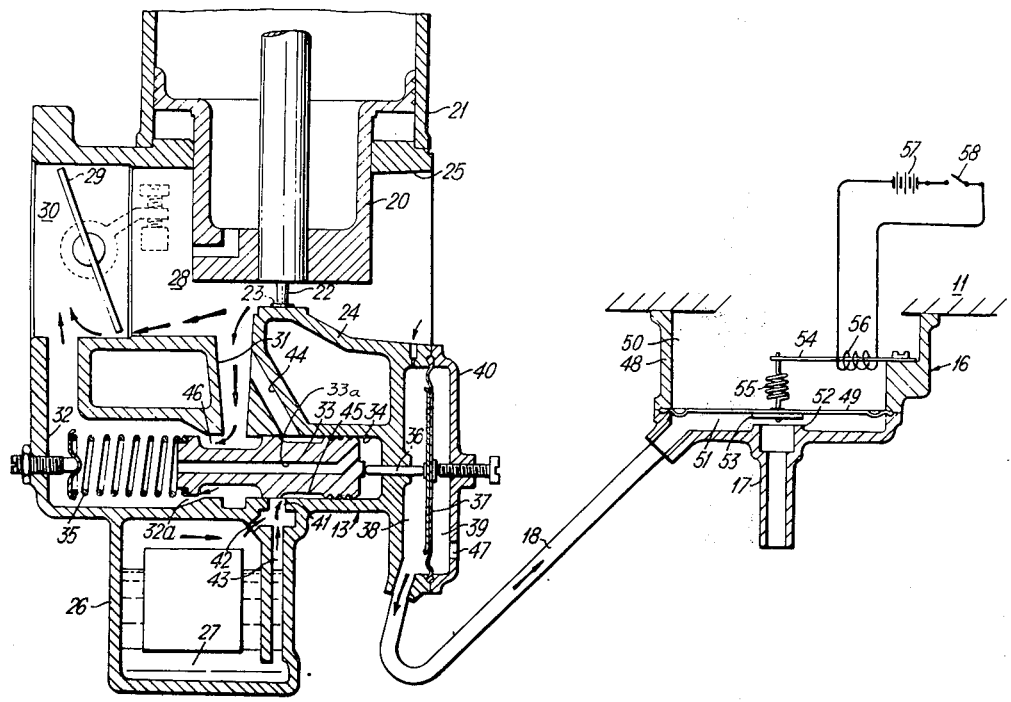

4 Claims, 2 Drawing Figures